United States Patent
Germ et al.

(10) Patent No.: US 8,579,240 B2
(45) Date of Patent: Nov. 12, 2013

(54) SEALING TIE CLIP THAT HOLDS AN OBJECT AND PREVENTS LATERAL MOVEMENT THERETO

(75) Inventors: Kenneth B. Germ, Niles, OH (US); Jay Harold Garretson, Warren, OH (US); George Skinner, Garrettsville, OH (US); Mark J. Koty, Columbiana, OH (US)

(73) Assignee: Delphi Technologies, Inc., Troy, MI (US)

( * ) Notice: Subject to any disclaimer, the term of this patent is extended or adjusted under 35 U.S.C. 154(b) by 29 days.

(21) Appl. No.: 13/178,165

(22) Filed: Jul. 7, 2011

(65) Prior Publication Data
US 2013/0009021 A1    Jan. 10, 2013

(51) Int. Cl.
*F16L 3/08*    (2006.01)

(52) U.S. Cl.
USPC ............. 248/74.3; 248/62; 248/69; 248/71; 24/16 PB; 24/17 AP

(58) Field of Classification Search
USPC ............ 248/71, 74.3, 68.1, 74.4; 24/17 AP, 24/16 PB, 453
See application file for complete search history.

(56) References Cited

U.S. PATENT DOCUMENTS

| | | | |
|---|---|---|---|
| 3,252,677 A | 5/1966 | Raymond | |
| 3,463,427 A | 8/1969 | Fisher | |
| 4,568,215 A * | 2/1986 | Nelson | 403/13 |
| 5,921,510 A * | 7/1999 | Benoit et al. | 248/71 |
| 6,149,336 A | 11/2000 | Bartley et al. | |
| 6,821,595 B2 * | 11/2004 | Murcia et al. | 428/49 |
| 7,055,783 B2 * | 6/2006 | Rosemann et al. | 248/71 |
| 7,198,315 B2 * | 4/2007 | Cass et al. | 296/29 |
| 7,753,321 B2 | 7/2010 | Geiger | |
| 2009/0172921 A1 * | 7/2009 | Vermeer et al. | 24/16 PB |

OTHER PUBLICATIONS

Unknown Author, HellermannTyton 126-03100, TS16949:2009, 3 pages. http://www.hellermanntyton.us/productDetail.aspx?lon=126-03100.

Unknown Author, HellermannTyton 156-00264, TSI16949:2009, 3 pages. http://www.hellermanntyton.us/productDetail.aspx?lon=156-00264.

* cited by examiner

*Primary Examiner* — Amy J Sterling
(74) *Attorney, Agent, or Firm* — Robert L. Myers

(57) ABSTRACT

A tie clip includes a strap body formed of a first material. The strap body has a first and second end, a strap retention member, a plurality of teeth disposed on the strap body, and a securing member. The strap body also includes sealing member that is formed of a second material that is different from the first material. The second material is directly chemically bonded to the first material. The first end of the strap body is received in a unidirectional manner in the strap retention member so as to form a loop that fixedly holds at least one object such that the object is prevented from having lateral movement through the loop. When the securing member is fastenably secured within a hole of a mounting structure, the sealing member sealingly engages against the mounting structure surrounding the hole to prevent environmental element intrusion therethrough.

15 Claims, 5 Drawing Sheets

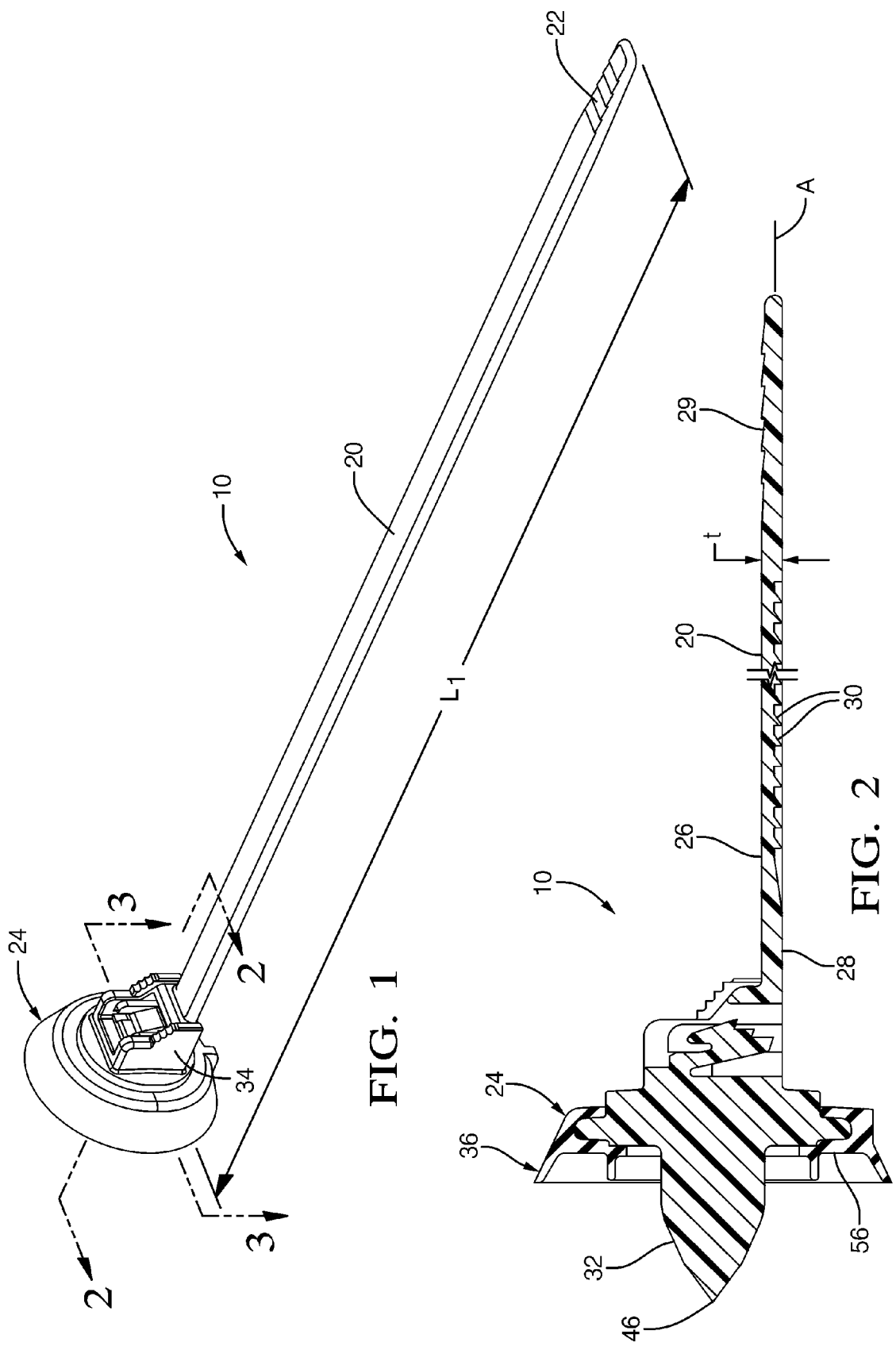

SEALING TIE CLIP THAT HOLDS AN OBJECT AND PREVENTS LATERAL MOVEMENT THERETO

TECHNICAL FIELD

This invention relates to a tie clip that secures to a mounting structure and holds an object.

BACKGROUND OF INVENTION

It is known to use a cable strap mounted within a hole of a mounting structure that holds an object within the clasped cable strap.

One type of cable strap uses a foam gasket that is adhesively attached to a portion of the cable strap. For example, when the cable strap is fastened within a hole of a door of the vehicle, the foam gasket press-fits against an external surface of the door surrounding the hole. While the press-fit foam gasket is intended to prevent environmental elements from penetrating past the gasket, the foam material may undesirably allow environmental elements, especially liquid environmental elements, to permeate through the material of the foam gasket. While the press-fit foam gasket may initially keep out environmental elements from entering an interior section of the door, the passage of time may affect the reliability of the foam gasket such that the integrity of the foam gasket may lesson by undesirably degrading. The degradation of the foam gasket may further undesirably escalate with exposure of the cable strap to a variety of temperature extremes typically encountered in vehicular applications. If the foam gasket degrades, it may allow environmental elements, such as moisture, dirt, and dust, to move past the degraded gasket and in to an interior of the door that may undesirably cause the formation of rust to develop within the interior of the door. Additionally, a degraded foam gasket may loosen the attachment of the cable strap within the hole such that the cable strap may produce an undesired rattle noise. The rattle noise may be heard by the driver or passengers of the vehicle when the vehicle is operated. These undesired issues may result in increased warranty costs for an automobile manufacturer or service costs to an owner of the vehicle to replace the faulty cable strap. Rust that may develop as a result of environmental element intrusion due to a faulty cable strap may reduce the quality and reliability of the door or the door operation which may also increase the warranty and service costs to service or replace the rusted vehicle door. Any number of cable straps may be used to assist the orderly dressing and securement of wire conductors, or cables within the vehicle during vehicle assembly. While the cable strap may hold a plurality of wire cables in a wiring harness, as the wire harness reaches a destination that terminates at a particular electronic component, only a single wire cable may need to be retained by a cable strap. If one or more of the cable straps disposed on the cable harness laterally slip and slide along loops formed in the respective cable straps during vehicle assembly, this undesired lateral movement of the cable straps along the wire harness may undesirably increase the amount of time to assemble the wire harness in the vehicle. A human vehicle assembler then has to take additional time to readjust the loop of the cable strap back to a position along a length of the wire harness that allows the cable strap to be properly secured within a hole in a mounting structure of the vehicle. While this remedial action is needed to ensure a high quality vehicle, this may negatively slow down the line speed of a vehicle assembly line. In yet other applications, the cable strap, or tie clip may not satisfactorily hold a single wire cable so that lateral movement of the single wire cable through the loop of the tie clip is prevented.

Thus, what is needed is a robust tie clip that overcomes the aforementioned shortcomings over the service life of vehicle where the tie clip is employed.

SUMMARY OF THE INVENTION

In accordance with one embodiment of the invention, a tie clip secures within a hole defined in a mounting structure and holds an object. The tie clip includes a strap body formed of a first material having a length disposed along a longitudinal axis. The strap body includes a first end and a second end axially remote from the first end. The strap body further includes a plurality of teeth formed along at least a portion of the strap body along the length. The strap body also includes a securing member disposed at the second end to engage the hole when inserted therein. The strap body further includes a sealing member that surrounds at least a portion of the securing member. The sealing member is formed of a second material different from the first material. The second material of the sealing member is attached to the first material by being directly chemically bonded thereto without the use of a bonding agent layer disposed therebetween. The sealing member sealingly engages with the mounting structure surrounding the hole when the securing member is secured therein. The strap body yet further includes a strap retention member disposed intermediate the securing member and the plurality of teeth where the plurality of teeth unidirectionally engage the strap retention member when the first end of the strap body is inserted therein.

A method of fabricating a tie clip includes a step of providing a first material and a second material different from the first material to at least one cavity in a mold. A further step in the method includes injection molding the first material to form at least a portion of the tie clip. Another step in the method includes injection molding the second material in the cavity to form a sealing member of the tie clip that communicates with the injected molded first material.

These and other advantageous features as disclosed in the embodiments of the present invention will be become apparent from the following brief description of the drawings, detailed description, appended claims and drawings.

BRIEF DESCRIPTION OF THE DRAWINGS

This invention will be further described with reference to the accompanying drawings in which:

FIG. 1 shows a left hand perspective view of the tie clip according to the invention;

FIG. 2 shows an axial cross section view of the tie clip of FIG. 1 through the lines 2-2;

DETAILED DESCRIPTION

Figure 3:
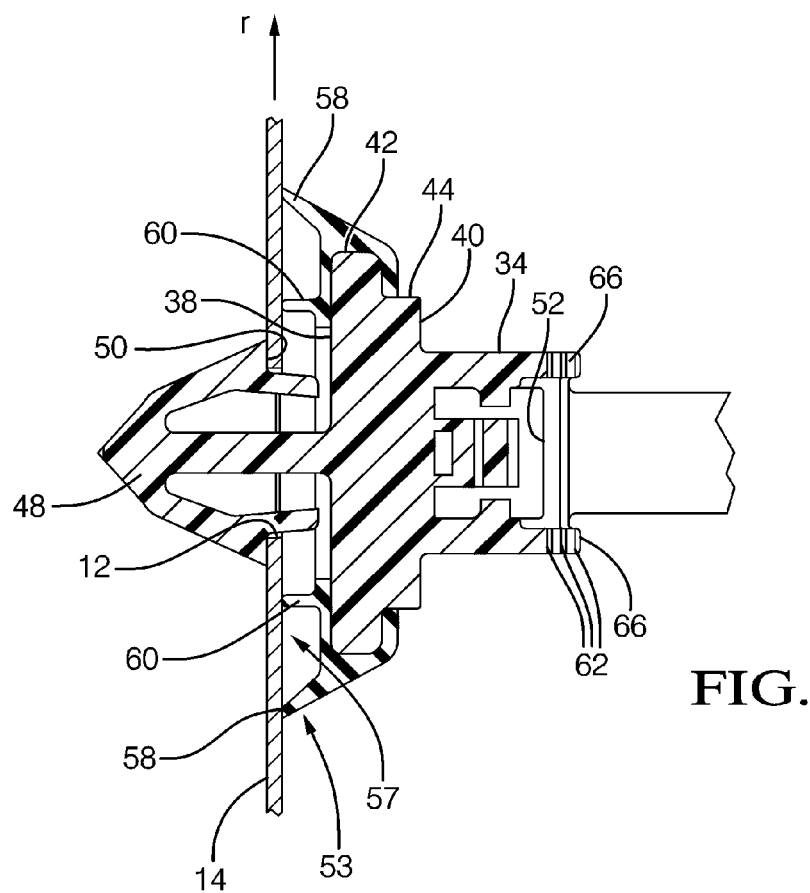
FIG. 3 shows a perpendicular cross section view at a second end of the tie clip of FIG. 1 through the lines 3-3.
Figure 4:
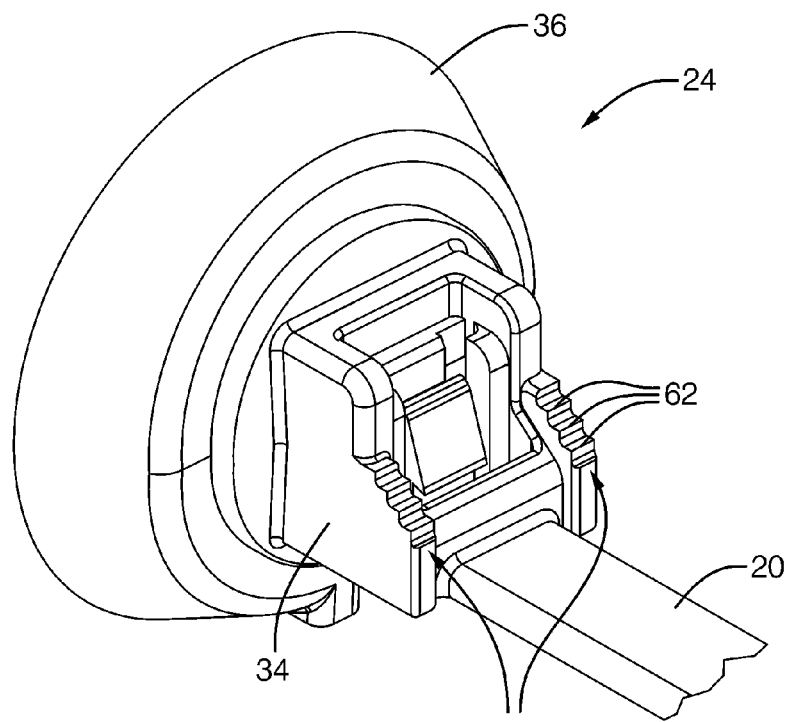
FIG. 4 shows a magnified view of the second end of the tie clip of FIG. 1.
Figure 5:
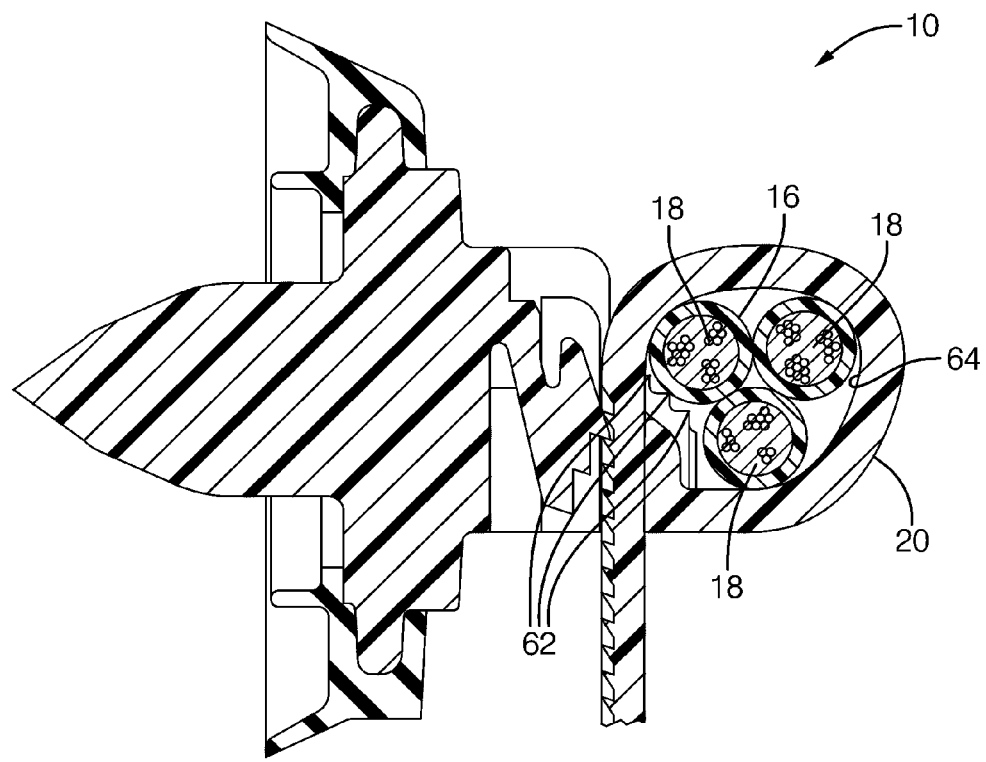
FIG. 5 shows a plurality of wire conductors held in a loop of the tie clip of FIG. 1.

If a tie clip is disposed in an area of the vehicle subject to environmental elements such as moisture, dirt, and dust there may be a need to keep these environmental elements from intruding past the secured tie clip on the vehicle into an area on the opposing side of a panel or mounting structure of the vehicle over the service life of the vehicle. The tie clip may be particularly useful in doors or in an engine compartment of the vehicle to hold and retain portions of wire cables associated with wiring harnesses along wiring routes within the vehicle.

In accordance with one aspect of the invention, referring to FIGS. 1-8, a tie clip 10 is presented. Tie clip 10 is secured to a hole 12 defined in a mounting structure 14 of the vehicle (not shown) and holds an object 16. Object 16 is at least one wire cable, or wire conductor 18. Alternately, object 16 may be any type of object that needs to be held by tie clip 10. Tie clip 10 is robustly constructed to hold wire conductor 18 and prevent undesired lateral movement of wire conductor 18 through tie clip 10 and also prevent undesired environmental element intrusion past tie clip 10 in to an area beyond tie clip 10 within a vehicle (not shown). In one vehicular application, upwards of four tie clips may be used in a single door of a vehicle. When the tie clip 10 is used in vehicle door application, environmental protection from water spray or splash intrusion experienced when a vehicle goes through a car wash is particularly desired. These features are prevalent over the operational service life of a vehicle (not shown) which may be, for example, ten (10) calendar years. In a further alternate embodiment, the tie clip may be used in any application in the motorized transportation industry where an object is needed to be laterally held in place. Still alternately, the tie clip may be used in any product application that needs to laterally hold in place an object and prevent environmental element intrusion from occurring under, around, or permeating through the tie clip.

Tie clip 10 includes a strap body 20 having a length $L_1$ disposed along a longitudinal axis A. Strap body 20 includes a first end 22 and a second end 24 axially opposed from first end 22. Strap body 20 further includes a generally planar first external surface 26 along a majority portion of tie clip 10 and a generally planar second external surface 28 opposite first external surface 26. Surfaces 26, 28 have a spaced relationship determined by a desired thickness t of tie clip 10 where thickness t is generally perpendicular to axis A. First external surface 26 includes a plurality of pulling teeth 29 disposed at first end 22 that may assist a human assembler to physically handle and more easily grab first end 22 for insertion in strap retention member 34, and is known in the cable strap arts. Strap retention member 34 is constructed to secure plurality of securing teeth 30 of tie clip 10 after initial insertion of first end 22 in strap retention member 34. Second external surface 28 includes plurality of securing teeth 30 formed along at least a portion of length $L_1$ of strap body 20 intermediate first end 22 and strap retention member 34. Generally, the angle of each tooth in plurality of pulling teeth 29 is smaller than the angle of each tooth in plurality of securing teeth 30. Alternately, the pulling teeth may be employed on the other side or on each side of the strap retention member. Still yet alternately, the plurality of securing teeth may be formed on the first surface if the strap retention member is constructed to receive the plurality of securing teeth disposed on the first surface. Still yet alternately, the securing teeth may be disposed on both surfaces of the strap body if the strap retention member would be correspondingly constructed to secure the securing teeth on both surfaces which may be desirable with if the tie clip is employed in an application that needs to hold larger objects.

Strap body 20 further includes a securing member 32, a strap retention member 34, a sealing member 36, a planar base 38, and a molding shut-off member 40. Respective members 32, 34, 36, 40 and base 38 are disposed at second end 24 with securing member 32 being the most distally disposed at second end 24, as best illustrated in FIG. 2. Base 38 and molding shut-off member 40 are disposed intermediate securing member 32 and strap retention member 34 along axial length $L_1$. Using planar base 38 is useful instead of using a concave-shaped base to facilitate ease of injection molding the second material of sealing member 36 when tie clip 10 is constructed. A concave-shaped base may undesirably move within a cavity of a mold used to construct tie clip 10 and may not allow a clean molding of the sealing member 36 to occur that may result in additional usage of the second material which increases material costs to construct tie clip 10. Base 38 has a base perimeter 42 and molding shut-off member 40 has a shut-off member perimeter 44. Strap retention member 34 is disposed intermediate molding shut-off member 40 and plurality of securing teeth 30 along length $L_1$. And molding shut-off member 40 is disposed intermediate base 38 and strap retention member 34 along length $L_1$. Referring to FIG. 2, at least a portion of sealing member 36 has an adjacent relationship to base 38 where the portion has direct communication with molding shut-off member 40 along the shut-off member perimeter 44. Sealing member 36 encapsulates a majority portion of base 38 including the entire base perimeter 42 in a manner such that sealing member 36 further directly contacts molding shut-off member 40 completely around the entire shut-off member perimeter 44. Molding shut-off member 40 desirably provides a structure disposed on tie clip 10 that allows the formation of sealing member 36 to be controlled by provisions in the mold used to construct tie clip 10. The shape of sealing member 36 may then be controlled within the mold so that unnecessary, wasteful amounts of the second material are not needed to construct sealing member 36. Alternately, the sealing member may be molded in a manner to further encapsulate the molding shut-off member and be terminated axially remote from the molding shut-off member at some point along the strap retention member. Still yet alternately, the base and the shutoff member may combine to form a single base structure. In one embodiment, the single base structure may have a shape that is a conical tapered shape having an increasing diameter in a direction towards the securing member. This conical tapered-shaped base structure may then provide a simplified shut-off to construct the sealing member. The sealing member may engage the conical tapered-shaped base structure at a point along the structure or may substantially enclose the structure. The base and the shutoff member or the single base structure may be any shape that allows the sealing member to be properly and cleanly shut-off against the strap body of the tie clip when the tie clip is fabricated in a mold.

Securing member 32 engages hole 12 when inserted therein. Securing member 32 includes a pointed piercing tip 46 that is useful to pierce and penetrate through cloth-like material, or fabric that may be disposed on the other side of hole 12 in relation to an insertion direction of tie clip 10 to initially engage hole 12. Tip 46 may advantageously assist to keep a human assembler on a vehicle assembly line from having to undesirably cut a clearance opening or slit in the fabric with a cutting tool, like a knife, so securing member 32 may be fully insertable in hole 12 in a single insertion movement without being blocked from insertion by the fabric material. If securing member 32 is blocked from insertion in hole 12, securing member 32 cannot secure tie clip 10 within hole 12. Securing member 32 is a rosebud-type structure 48 that engages and locks to an edge of hole 12 so as to be fitted and receivably coupled in hole 12, as best illustrated in FIG.

3. A shoulder 50 on rosebud 48 traps rosebud 48 against mounting structure 14 after shoulder 50 is inserted through hole 12, as best illustrated in FIG. 3. Alternately, the securing member may be a fir tree-type structure that may be used to engage holes having a larger thickness. The fir tree-type structures typically have a plurality of shoulders where at least one of the shoulders will engage the mounting structure on an opposing side from the insertion direction of the fir tree-type structure depending on the thickness of the hole defined in the mounting structure. The rosebud-type and fir tree-type mounting structures are known mounting structures used on tie clips, cable straps, and the like, in the cable strap arts. Sealing member 36 surrounds at least a portion of rosebud 48 so that when rosebud 48 is secured within hole 12, sealing member 36 sealingly engages mounting structure 14 surrounding hole 12. At least a portion of sealing member 36 has an axial adjacent relationship to base 38. Plurality of securing teeth 30 unidirectionally engage strap retention member 34 when first end 22 of strap body 20 is inserted through an opening 52 of strap retention member 34 and securing teeth 30 of strap body 20 are pulled in to, and engage in strap retention member 34.

Strap body 20 is formed from a first material and includes plurality of pulling teeth 29, plurality of securing teeth 30, securing member 32, and strap retention member 34. The first material is a non-porous material. Strap body 20 also includes a sealing member 36 that is formed from a second material that has a different material composition than the first material. The second material is also a non-porous material in contrast to the foam gasket of current cable straps as described in the Background. The second material of sealing member 36 is attached to the first material of strap body 20 by being directly chemically bonded to the first material. The direct chemical bonding of the first material and the second material is attained without the use of an adhesive, or bonding agent layer disposed between the first and the second material.

Sealing member 36 advantageously prevents environmental element intrusion from occurring through three possible leak paths of tie clip 10. A first leak path may occur between the first material of tie clip 10 and the second material of sealing member 36. The chemical bonds formed between the first and the second material of tie clip 10 close the possible first leak path in a manner that prevents environmental element intrusion between the first and the second material. The direct chemical bonding between the first material of the sealing member 36 and the second material of the tie clip 10 are also sufficiently strong so that a shear strength test may cause the tie clip 10 to break at a point along the tie clip 10 remote from the chemical bonds of the first and second material. A second leak path may occur if environmental elements, permeate, spread, or diffuse through the second material of sealing member 36 as may occur with current strap members having foam gaskets as described in the Background herein. In contrast, the non-porous material composition of the second material of sealing member 36 prevents the environmental elements from possible diffusion through the second material. Thus, the material composition of the second material prevents environmental elements from diffusing through the second material of sealing member 36 of tie clip 10. Preferably, the second material of sealing member 36 is formed of a thermoplastic elastomer (TPE) material. Tie clip 10 apart from sealing member 36 is preferably has a first material formed from a non-TPE material. Even more preferably, the first material is formed of a PA66, or nylon material. The TPE material of sealing member 36 has a certain amount of stiffness, yet is resiliently flexible and pliable and has an elasticity to attain a seal with mounting structure 14 surrounding hole 12 when securing member 32 is secured to mounting structure 14 after insertion within hole 12. A third leak path may occur at an interface 53 between an edge of sealing member 36 and mounting structure 14 surrounding hole 12. The seal formed at interface 53 by sealing member 36 engaging against mounting structure 14 prevents environmental element intrusion moving around, or past sealing member 36 at interface 53 such that environmental element leakage at the third leak path is prevented.

Sealing member 36 includes at least one sealing rib 58, 60 extending away from an external surface 56 of sealing member 36. At least one sealing rib 58, 60 has a radial, circularly form that surrounds axis A having a diameter that is greater than a diameter of hole 12. At least one rib 58, 60 sealingly engages mounting structure 14 encircling hole 12 thereabout when securing member 32 secures tie clip 10 within hole 12. At least one sealing rib 58, 60 includes a first outer sealing rib 58 and a second inner sealing rib 60 disposed inbound first outer sealing rib 58. Thus, second inner sealing rib 60 is disposed closer to hole 12 than first outer sealing rib 58 when tie clip 10 is secured within hole 12. Second sealing rib 60 generally also has a larger thickness than a distal end of first sealing rib 58. Second sealing rib 60 engages mounting structure 14 and press-fits against mounting structure 14 surrounding hole 12. A larger thickness of second sealing rib 60 provides increased confidence and reliability that ribs 58, 60 provide a complete, effective barrier that prevents environmental element infiltration past interface 53 of first sealing rib 58 and a another interface 57 at second sealing rib 60, especially for thicker mounting structures. For thinner mounting structure thicknesses, first sealing rib 58 may be more than adequate to prevent the environmental element intrusion. Second sealing rib 60 provides a measure of sealing redundancy should environmental element intrusion get past, or move by first sealing rib 58. Correspondingly, first and second ribs 58, 60 have respective diameters that are greater than a diameter of hole 12. Further, ribs 58, 60 respectively sealingly engage against mounting structure 14 encircling hole 12 when rosebud 48 secures tie clip 10 within hole 12. As a force is applied against securing member 32 to insert securing member 32 in hole 12, ribs 58, 60 engage mounting structure 14 surrounding hole 12 so that at least first sealing rib 58 slidably sealingly engages against mounting structure 14 after initial engagement with mounting structure 14 in a manner where at least first sealing rib 58 moveably slides in a radial direction r outwardly away from hole 12 to attain the seal against mounting structure 14. First sealing rib 58 may slide a greater radial distance when tie clip 10 is secured in a mounting structure 14 having a greater thickness over a mounting structure 14 formed of a thinner material. When rosebud 48 is trapped against mounting structure 14 by shoulder 50, this ensures a pressure is applied on sealing ribs 58, 60 to keep sealing ribs 58, 60 sealed against a surface of mounting structure 14.

Figure 6:
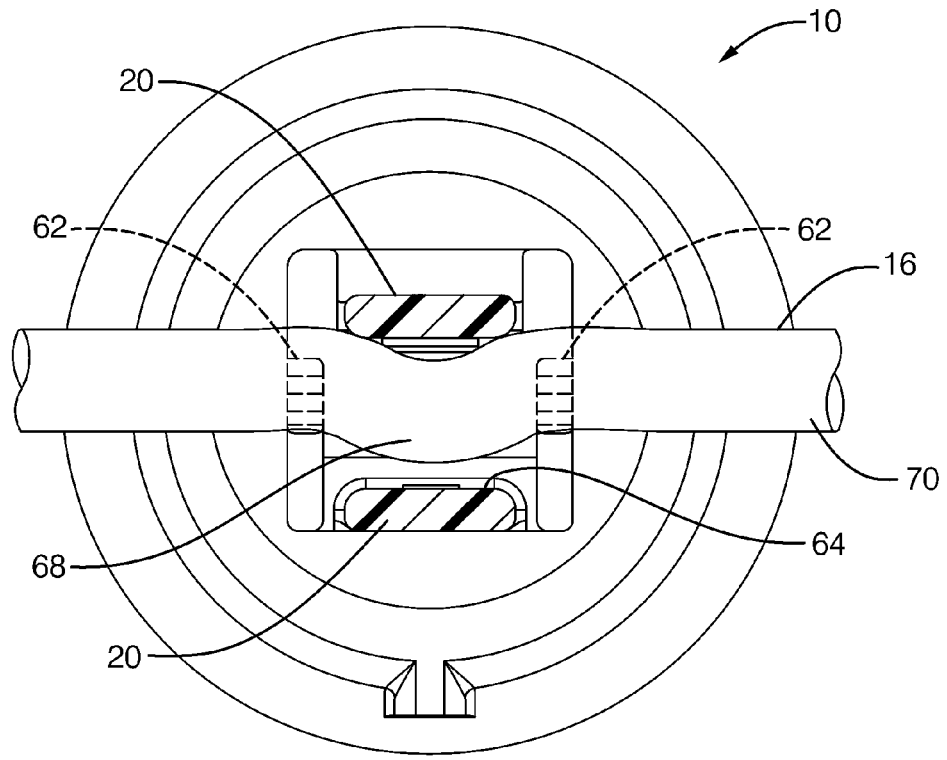
FIG. 6 shows a single wire conductor held in a loop of the tie clip of FIG. 1.

Strap retention member 34 further includes a plurality of engagement teeth 62 that engage at least one wire conductor 18 when first end 22 of strap body 20 is received in strap retention member 34 forming a loop 64 of strap body 20 that is sufficiently surroundingly tightened around at least one wire conductor 18. Plurality of engagement teeth 62 are formed in a plurality of spaced apart rows 66 where plurality of engagement teeth 62 are disposed along axis A in an off-axis direction. The off-axis direction is generally an acute angle in relation to axis A. Because of the off-axis direction of plurality of engagement teeth 62, a deviation, or deflection 68 is formed in the at least one wire conductor 18 as loop 64 is sufficiently surroundingly tightened against the at least one wire conductor 18. While deflection 68 may be seen when multiple wire conductors 18 are held in loop 64, deflection 68 is more noticeable if only one wire conductor 18 is held within loop 64, as best illustrated in FIG. 6. Deflection 68 is formed intermediate plurality of spaced apart rows 66 in a direction perpendicular to axis A by at least one wire conductor 18 engaging against plurality of engagement teeth 62 on each side of deflection 68 where engagement teeth 62 bitingly engage against at least one wire conductor 18. Deflection 68 may have a U-shape where the form of the U-shape depends on the number of wire conductors that are contained within loop 64 and how tightly loop 64 is cinched against at least one wire conductor 18. When at least one wire conductor 18 is cinched against plurality of engagement teeth 62 from loop 64, there is substantially no lateral movement of at least one wire conductor 18 through loop 64. Loop 64 of tie clip 10 may also be sufficiently tightened and cinched to advantageously hold only a single wire conductor 70 against at least a portion of plurality of engagement teeth 62 so as to prevent lateral movement of single wire conductor 70 through loop 64. The gripping power of engagement teeth 62 is generally greater when engagement teeth 62 engage a plurality of wire conductors in contrast to only a single wire conductor 70. In one embodiment, five engagement teeth 62 are employed. In another embodiment, less than five engagement teeth 62 are utilized. When less than five engagement teeth 62 are used, the teeth may be taller and wider which may provide more surface area to provide for increased frictional engagement with the at least one wire conductors.

Figure 7:
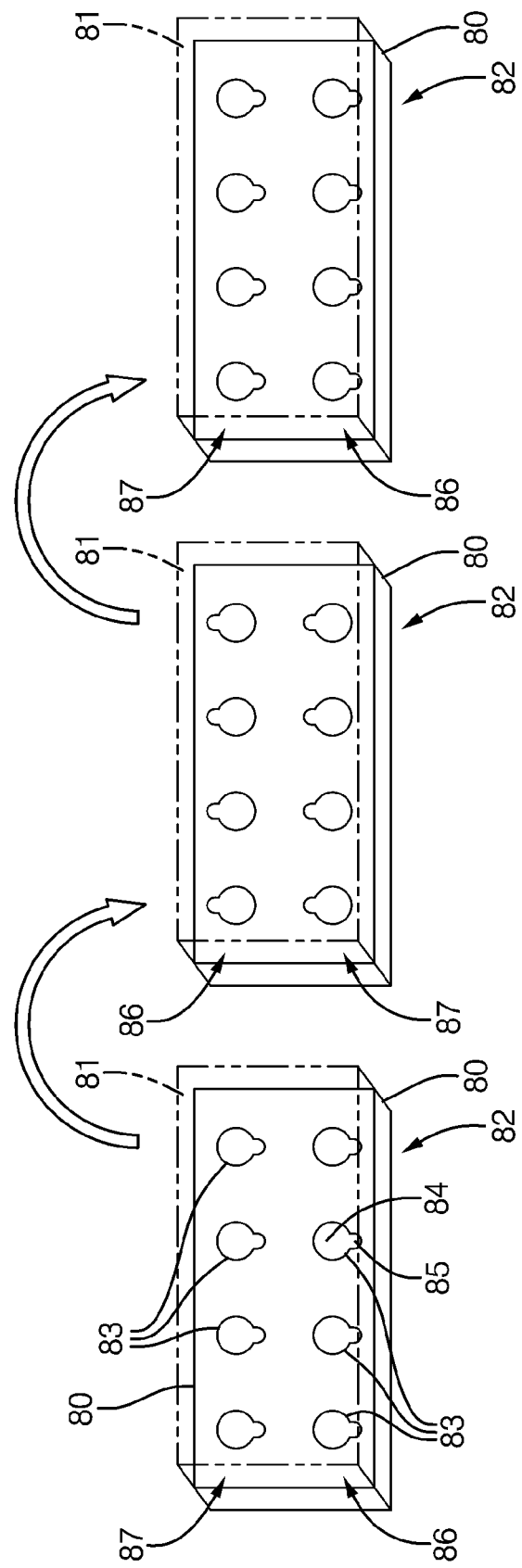
FIG. 7 shows a mold and how the tie clip of FIG. 1 is made using the mold.
Figure 8:
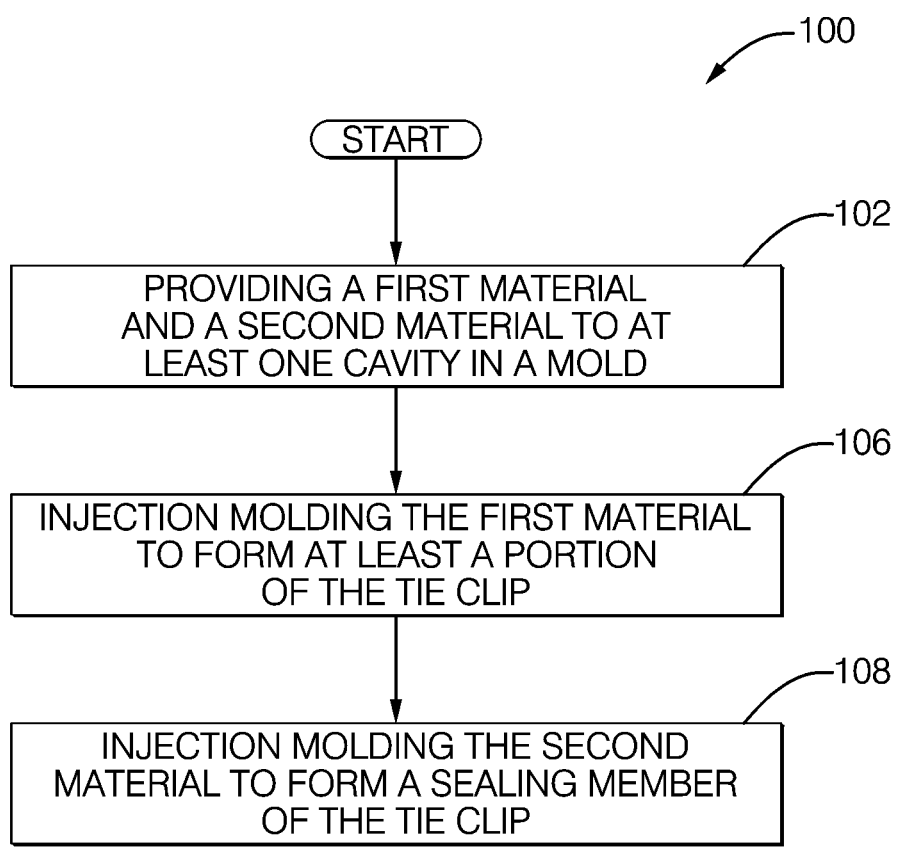
FIG. 8 shows a method of fabricating the tie clip of FIG. 1.

Tie clip 10 is fabricated in an injection mold machine (not shown) in a single molding process. Two halves 80, 81 of a mold 82 define a plurality of identical mold cavities 83 to injection mold tie clip 10. Each identical mold cavity 83 has a first mold cavity 84 and a second mold cavity 85 in communication with first mold cavity 84. Four mold cavities 83 are defined in an upper, or first half position 86 of mold 82 and four mold cavities 83 are defined in a lower, or second half position 87 of mold 82, as best illustrated in FIG. 7. In another alternate embodiment, a mold includes eight cavities 83 in the first half position 86 and eight mold cavities 83 in the second half position 87. In yet another alternate embodiment, any number of mold cavities 83 may be constructed that may be limited only by the size of the molding machine. Tie clip 10, as previously described herein, is formed from two different materials. The first material is provided to four cavities 83 in upper position 86 of mold 82 to first mold cavity 84 where a majority portion of strap body 20 of tie clip 10 is injection molded which includes all of strap body 20 except sealing member 36. Providing the first material and a second material to mold 82 is step 102 in method 100 of fabricating tie clip 10. Injection molding the first material is step 108 of method 100. Mold half 80 is rotated 180 degrees with respect to stationary half 81 in the injection mold machine to now mold sealing member 36 to the previously injection molded majority portion of tie clip 10. The second material is further supplied to mold 82 to cavities 83 in lower position 97 of mold 82 that contain the previously molded majority portion of tie clip 10. The second material is injection molded to the four mold cavities 83 in the lower position 97 of mold 82 to form sealing member 36 of tie clip 10 which is step 106 of method 100. At the same time, the four cavities 83 in upper position 86 of mold 82 have the majority portion of injection molded tie clip 10. After the injection molding of sealing member 36, the completely injection molded tie clip 10 is retained in mold 82 until tie clip 10 is ejected from mold 82, as also previously discussed herein. Thus, tie clip 10 is formed with the first material except for sealing member 36 which is formed of the second material and the second material directly chemically bonds to the first material without the use of bonding agent layer disposed intermediate the first and the second material. After cooling, the injection molded tie clip 10 is released from mold 82. Mold half 80 is again rotated such that a new set of tie clips 10 may be constructed in mold 82. The first material is a nylon material and the second material is a TPE material which has also been previously described herein. Alternately, a mold may be made of any number of identical cavities with an equal number of cavities being symmetrical for the upper and the lower portions of the mold to construct a plurality of tie clips.

Tie clip 10 is not in use when first end 22 is not received in the second end 24 and securing member 32 is not received within hole 12 of mounting structure 14.

Tie clip 10 is partially in use if either tie clip 10 holds at least one wire conductor 18 within loop 64 of tie clip 10, as previously described herein. This may be the situation when one or more tie clips 10 are pre-assembled on a wiring harness (not shown) before the wire harness is installed in the vehicle during vehicle assembly. Securing member 32 of respective tie clips 10 may then be inserted in holes 12 within the vehicle during installation of the wire harness in the vehicle. Tie clip 10 may also be partially in use if securing member 32 is inserted so as to be received and secured by a hole 12 defined in mounting structure 14, but loop 64 has not yet been formed to hold at least one wire conductor 18.

Tie clip 10 is completely in use when tie clip 10 holds at least one wire conductor 18 and is also inserted and received within hole 12 of mounting structure 14. Sealing member 36 sealingly engages with mounting structure 14 of the vehicle surrounding hole 12 so that environmental element intrusion does not permeate through at least one sealing rib 58, 60. Sealing member 36 also sealing engages mounting structure 14 of the vehicle surrounding hole 12 so the environmental elements do not penetrate past interface 53 defined between first sealing rib 58 and mounting structure 14 of the vehicle and another interface 57 defined between second sealing member 60 and mounting structure 14. While sealing member 36 preferably seals out environmental elements external to tie clip 10 from entering hole 12 from an insertion direction of securing member 32 in hole 12, sealing member 36 may also seal out environmental elements that enter hole 12 from a side of mounting structure 14 that faces away from sealing member 36 coming in to tie clip 10 from a direction that is opposite the insertion direction of securing member 32.

Alternately, any American Wire Gauge (AWG) size of the at least one wire conductor may be used. The length of the strap body may also be sufficiently sized based on the object to be held by the tie clip 10.

While the embodiment of FIG. 3 shows the tie clip being secured to a planer mounting structure, alternately, the sealing member may also conform to seal in irregular surfaces with the assistance of the resilient at least one sealing member. One such irregular surface may be a mounting hole defined along a smooth, curved surface as may often be found along various vehicular structures.

Alternately, the sealing member may only contain a single sealing rib. And the single sealing rib may only be the outer sealing rib. In yet another alternate embodiment, more than two sealing ribs may be employed. In yet another alternate embodiment, the sealing ribs may have flared ends similar to first sealing rib 58 as shown in FIG. 3. When the sealing ribs have flared ends, the sealing ribs seal having moveable displacement radially away from the hole along the mounting structure when the securing member is secured in the hole.

Preferably, the first outer sealing rib has a greater height than the second inner sealing rib, and thus, will slidingly engage a greater radial distance than the second inner sealing rib. In yet a further alternate embodiment, the sealing ribs may have beaded ends or any other shape that enhances the sealing performance of the sealing member.

Thus, a robust tie clip that prevents environmental element intrusion from permeating or moving past a sealing member of the tie clip has been presented. A robust tie clip that holds an object and prevents lateral movement thereto through a sufficiently tightened loop around the object has also been presented. The tie clip is formed from a first material except the sealing member of the tie clip which is formed from a second material that is different from the first material. The first material is a non-TPE material and the second material is a TPE material. The second material directly chemically bonds to the first material. The TPE material of the sealing member has a material composition that prevents environmental elements from permeating through the TPE material. The TPE material is also sufficiently resilient to provide an environmental seal at an interface between the TPE material and the mounting structure surrounding the hole when the securing member is secured within the hole of a mounting structure. Even with the passage of time and the tie clip being exposed to temperature extremes, the integrity of the seal between the sealing member and a surface of the mounting structure remains intact. The sealing features of the tie clip may allow the tie clip to prevent rust formation on structures of the vehicle that are adjacent the hole where the tie clip is employed. The sealing member is disposed along a majority portion of the base of the tie clip that increases the amount of surface area for the second material of the sealing member to directly chemically bond to the first material of the tie clip. The shut-off member of the tie clip provides an advantageous structure to bound the fabrication of the TPE material at the shut-off member when the tie clip is constructed. This feature prevents wasting undesired additional TPE material that would otherwise be disposed on the tie clip. The tie clip is completely fabricated by injection molding of the first and second material in a single mold machine without additional assembly steps. The plurality of engagement teeth disposed on the strap retention member in an off-axis position assist to engage an object to prevent lateral movement of the object through a loop formed in the tie clip. One such object is a plurality of wire conductors and the wire conductors are held in a loop of the tie clip so that there is no lateral movement of the wire conductors through the loop. This feature is especially useful when the tie clips are predisposed on a wire harness having one or more wire conductors at specific locations along the wire harness. Since the tie clips are not prone to lateral movement along the wiring harness, this aids in the correct installation of the wiring harness in the vehicle by a human assembly operator without the operator having to additionally rework the tie clip back in to a correct position before cable harness installation in the vehicle. The tie clip also notably holds a single wire conductor so that the single wire conductor does not have lateral movement through the loop of the tie clip. The tie clip may be used in any product application that requires an object to be held by a tie clip while also preventing environmental element intrusion from permeating or moving past the sealing member and in to the hole.

While this invention has been described in terms of the preferred embodiment thereof, it is not intended to be so limited, but rather only to the extent set forth in the claims that follow.

It will be readily understood by those persons skilled in the art that the present invention is susceptible of broad utility and application. Many embodiments and adaptations of the present invention other than those described above, as well as many variations, modifications and equivalent arrangements, will be apparent from or reasonably suggested by the present invention and the foregoing description, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the following claims and the equivalents thereof.

We claim:

1. A tie clip configured to be secured within a hole defined in a mounting structure to secure an object thereto, comprising:
    a strap body formed of a first material having a length disposed along a longitudinal axis including a first end and a second end axially remote from the first end, the strap body including,
        a first plurality of teeth formed along at least a portion of the strap body,
        a securing member disposed at the second end to engage the hole when inserted therein,
        a strap retention member disposed intermediate the securing member and the first plurality of teeth, wherein the first plurality of teeth unidirectionally engage the strap retention member when the first end of the strap body is inserted therein,
        a planar base disposed intermediate the securing member and the strap retention member,
        a molding shut off member disposed intermediate the planar base and the strap retention member; and
    a sealing member that at least partially surrounds the securing member, wherein the sealing member is formed of a second material distinct from the first material, wherein the second material is chemically bonded to the strap body without a bonding agent layer disposed therebetween, wherein the sealing member encapsulates the base and at least partially encapsulates the molding shut off member.

2. The tie clip according to claim 1, wherein the second material is a non-porous material.

3. The tie clip according to claim 1, wherein the first material is a nylon material and the second material is a thermoplastic elastomer (TPE) material.

4. The tie clip according to claim 1, wherein the sealing member defines a first resilient sealing rib extending away from a surface of the sealing member that encircles the hole to sealingly engage the mounting structure surrounding the hole thereabout when the securing member secures the tie clip within the hole.

5. The tie clip according to claim 1, wherein the at least one sealing rib includes an outer sealing rib and an inner sealing rib disposed interior to the outer sealing rib, the outer and inner sealing ribs respectively encircle the hole to sealingly engage the mounting structure surrounding the hole thereabout when the securing member secures the tie clip within the hole.

6. The tie clip according to claim 1, further including a base disposed along an axis intermediate the securing member and the strap retention member, wherein at least a portion of the sealing member is adjacent to said base.

7. The tie clip according to claim 6, further including a shut-off member disposed intermediate the base and the strap retention member along the axis, and the portion of the sealing member is in communication with the shut-off member.

8. The tie clip according to claim 1, wherein the strap retention member further includes a second plurality of teeth that engage the first plurality of teeth when a loop of the strap body is sufficiently surroundingly tightened thereon, said loop being formed when the first end is received in the strap retention member.

9. The tie clip according to claim 8, wherein the first plurality of engagement teeth are formed in a plurality of spaced apart rows and wherein the first plurality of teeth are disposed along an axis intermediate the securing member and the strap retention member in an off-axis direction.

10. The tie clip according to claim 9, wherein the object comprises at least one wire conductor, and the loop is sufficiently tightened against the at least one wire conductor so that there is substantially no lateral movement of the at least one wire conductor through said loop.

11. The tie clip according to claim 10, wherein the at least one wire conductor consists only of a single wire conductor.

12. The tie clip according to claim 1, wherein the first sealing rib is configured to slidingly sealingly engage the mounting structure surrounding the hole in a direction radially outward from the hole.

13. The tie clip according to claim 1, wherein the mounting structure is disposed in a vehicle and the hole is defined in the structure of the vehicle, and when the tie clip is secured within the hole in the structure of the vehicle the first sealing rib sealingly engages with the structure of the vehicle surrounding the hole so that environmental element intrusion does not diffuse through the first sealing rib and does not penetrate past an interface defined between the first sealing member and the structure of the vehicle.

14. The tie clip according to claim 1, wherein the sealing member defines a second resilient sealing rib disposed interior to the first sealing rib, said second sealing rib extending away from a surface of the sealing member that encircles the hole to sealingly engage the mounting structure surrounding the hole thereabout when the securing member secures the tie clip within the hole.

15. The tie clip according to claim 14, wherein the a distal end of the second sealing rib has a larger thickness than a distal end of the first sealing rib.

* * * * *